A. S. WYSONG.
PRINTING MACHINE.
APPLICATION FILED DEC. 16, 1919.

1,365,879.

Patented Jan. 18, 1921.
3 SHEETS—SHEET 1.

INVENTOR
A. S. Wysong

ATTORNEY

A. S. WYSONG.
PRINTING MACHINE.
APPLICATION FILED DEC. 16, 1919.
1,365,879.
Patented Jan. 18, 1921
3 SHEETS—SHEET 2.
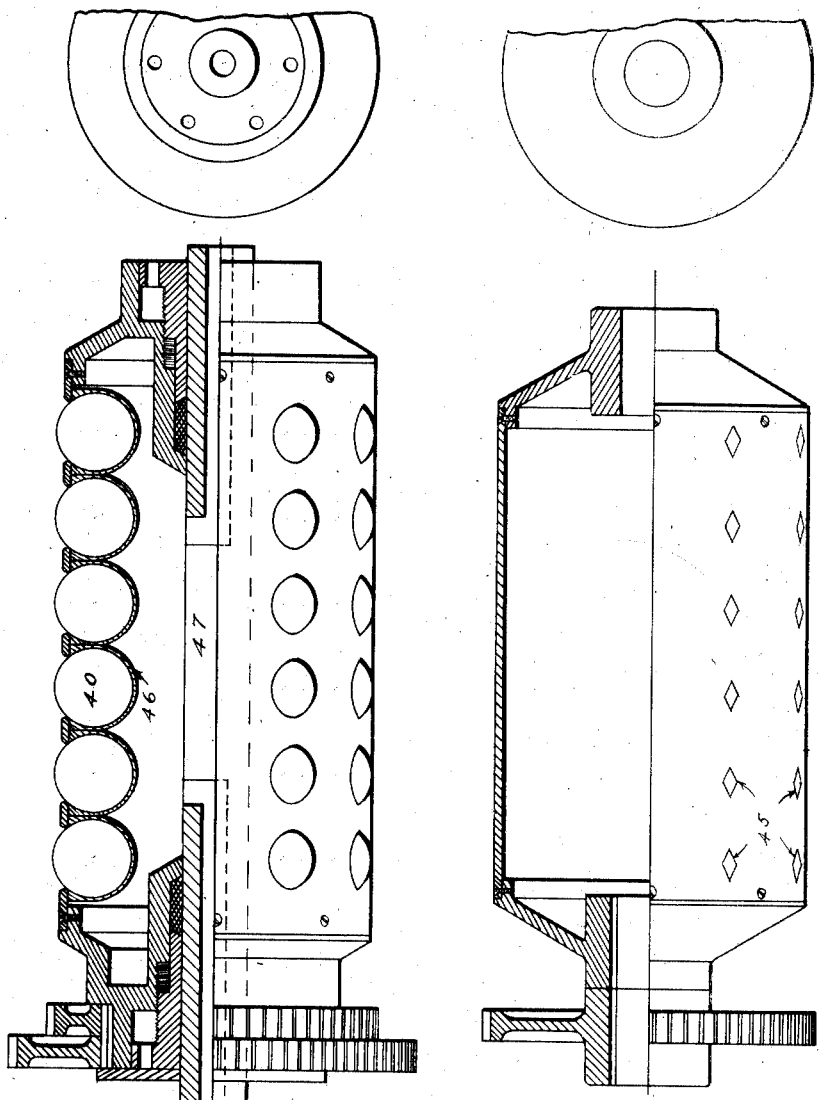
FIG. 4.  FIG. 3.
FIG. 5.  FIG. 6.
INVENTOR
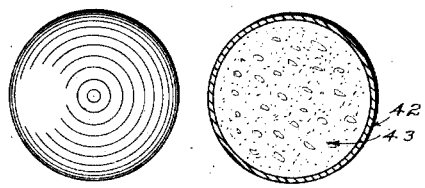
ATTORNEY

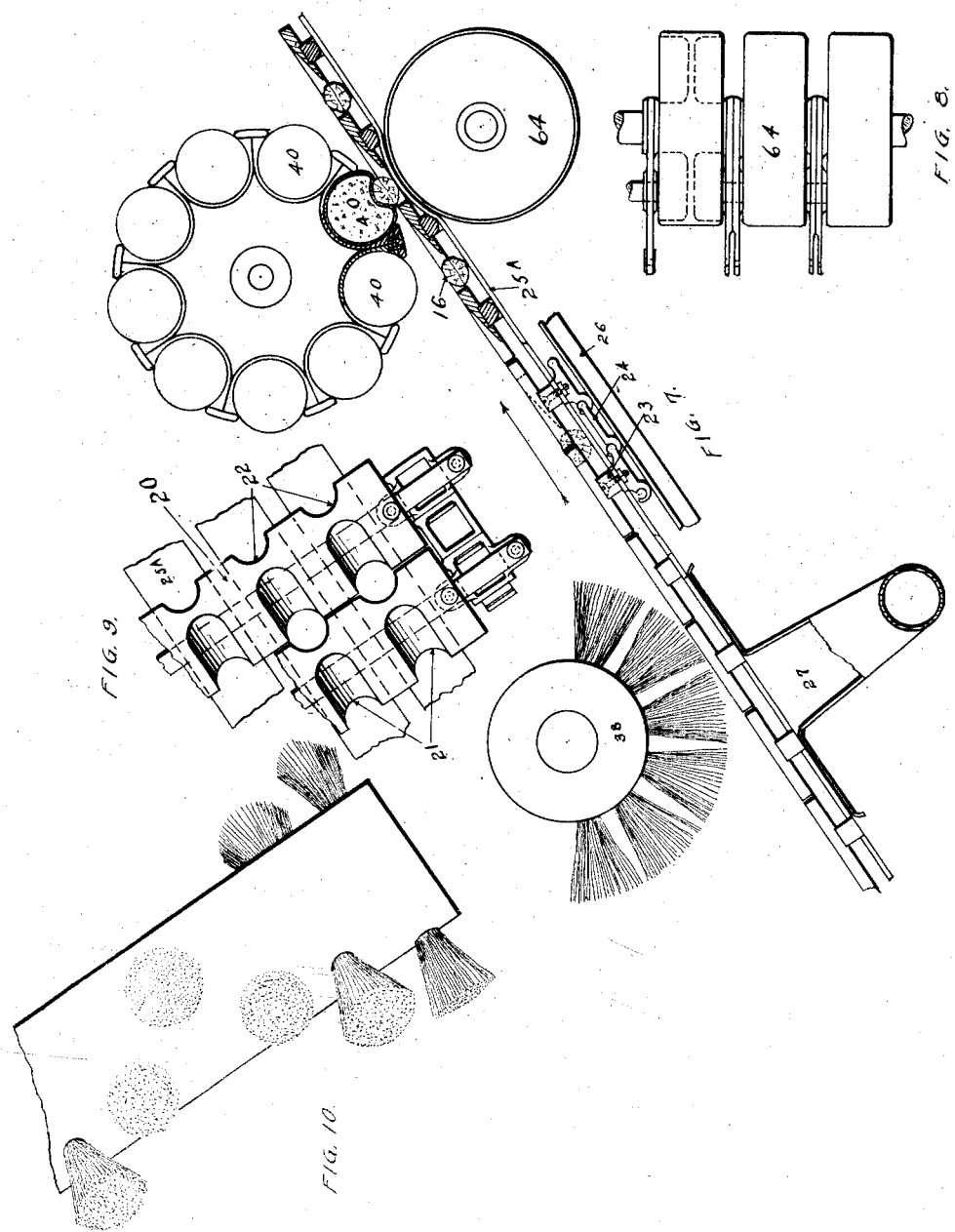

UNITED STATES PATENT OFFICE.

ANSEL S. WYSONG, OF LOS ANGELES, CALIFORNIA, ASSIGNOR TO FRANK C. YORK, TRUSTEE, OF LOS ANGELES, CALIFORNIA.

PRINTING-MACHINE.

1,365,879.  Specification of Letters Patent.  Patented Jan. 18, 1921.

Application filed December 16, 1919. Serial No. 345,346.

*To all whom it may concern:*

Be it known that I, ANSEL S. WYSONG, a citizen of the United States, residing at the city of Los Angeles, county of Los Angeles, and State of California, have invented new and useful Improvements in Printing-Machines, of which the following is a specification.

My invention relates to a machine for printing characters upon walnuts and other like nuts and upon apples and other round and firm fruits or on vegetables, and the object thereof, is to provide a machine suitable for these and other like objects.

Figure 1:
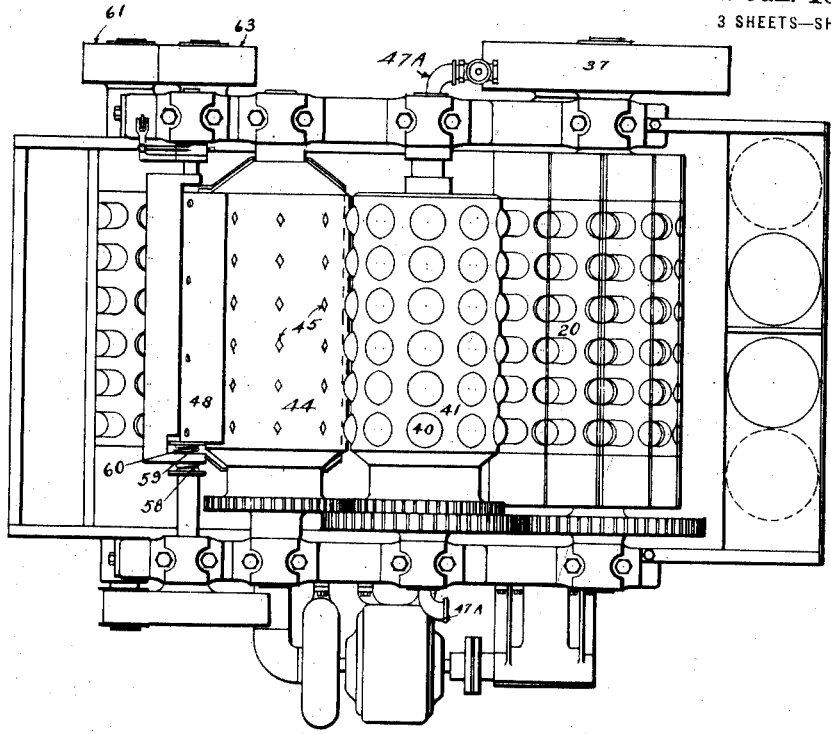
Figure 2:
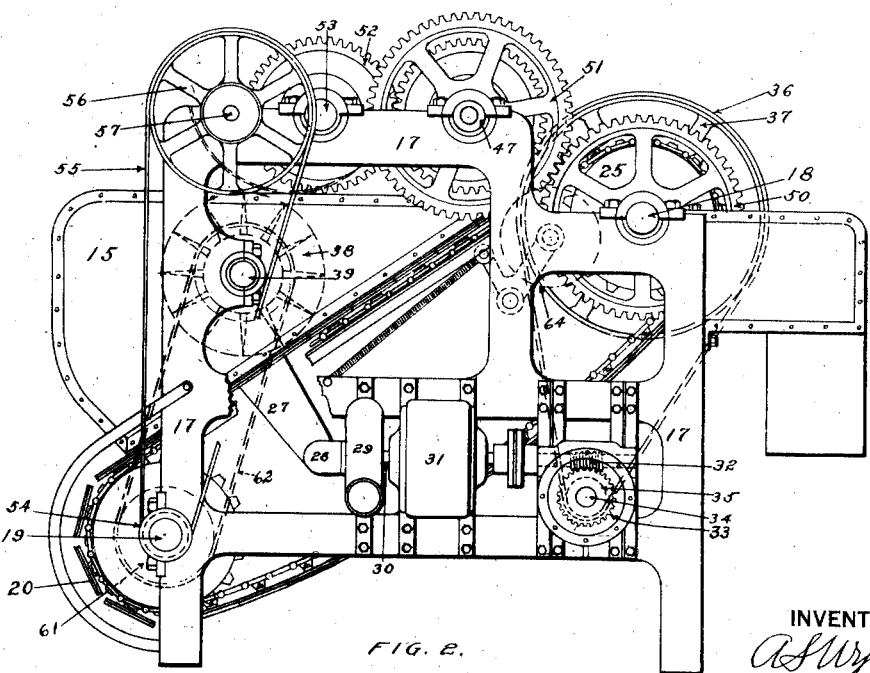

In the drawings forming a part of these specifications Figure 1 is a top plan view of a machine designed for printing characters upon walnuts. Fig. 2 is an end view partly broken away for clearness of illustration. Fig. 3 is a view partly in elevation and partly in section of the intaglio printing roller. Fig. 4 is a view partly in elevation and partly in section of the offsetting roller. Figs. 5 to 10 are detail views of parts of the machine, with some of the parts enlarged. Referring to the drawings 15 is the nut hopper into which the nuts 16 are deposited in any suitable manner. This hopper is secured to the frame 17. The bottom of the hopper is formed of a traveling nut belt which is carried by sprocket wheels mounted upon shafts 18 and 19. This belt is formed of transverse metal plates 20 each having semicircular notches 21 and 22 in the edges thereof. The notches of one plate register with the notches of the adjacent plate and thus form pockets into which nuts 16 are received as shown in Fig. 7. The edge of notches 21 are chamfered to near notches 22, thereby forming a sloping wall for the upper side of the nut pocket. Plates 20 are secured to bars 23. Chains 24 pass around sprocket wheels 25. These chains form a part of the belt. A fragment of one of these chains is shown in Fig. 7. Transverse bars 23 are secured to these chains. Secured to these transverse bars are flexible strips of belting 25ª which pass below the nut pockets and keep the nuts from falling through the pockets. Plates 20, chains 24, bars 23 and strips 25ª form the nut belt. The chains of the nut belt are supported by tracks 26 adjustably secured to the frame to keep the upper part of the nut belt from sagging. The upper portion of the nut belt travels upwardly and as soon as an empty pocket comes into the hopper a nut drops into it and in its travel it passes over suction hopper 27 which extends transversely of the frame. Hopper 27 is connected by pipe 28 to the suction port of an exhaust fan 29. The rotor of fan 29 is mounted on shaft 30 of the electric motor 31 which furnishes power to operate the machine. Shaft 30 carries a worm 32 which meshes with a worm wheel 33 on shaft 34. Shaft 34 carries a pulley 35 over which a belt 36 travels. Belt 36 also travels over a pulley 37 carried by shaft 18 so that when power is applied to the motor the suction fan operates to suck the nuts more firmly into the pockets and draws from their surface dust and dirt if any be on the nuts. A revolving brush 38 mounted on shaft 39 brushes the nuts down the belt and prevents the belt from carrying any nuts out of the hopper except those that are firmly seated in the pockets. When the nuts are carried to the upper end of the belt they engage offset balls 40 which are carried by roll 41. These balls are formed of an outer shell of rubber 42 which is filled with a plastic elastic compound 43 so that when the nuts engage the same the surface yields and conforms to the outer surface of the nut and deposits on the surface of the nut the character received from the characters on the intaglio roll 44. In the present machine these characters are shown as diamonds 45 which are cut into the surface of roll 44. Roll 41 is hollow and balls 40 are carried in pockets 46 formed in the shell of the roll which is mounted in the frame by hollow trunnions 47, one of which is connected by pipe 47ª to a suitable water supply, whereby a current of water flows through the roll and keeps the interior cool and thereby keeps balls 40 from being injured by heat. The water flows out through the other trunnion.

A scraper 48 removes any surplus ink that may be on roll 44 which is supplied with ink in the usual well known manner and is not illustrated as any part of my invention. On axle 18 is mounted gear 50 which meshes with gear 51 mounted on a trunnion 47. Gear 51 meshes with gear 52 mounted on axle 53 on which axle roll 44 is mounted. Axle 19 carries a pulley 54 over which belt 55 passes. Belt 55 also passes over pulley 56 mounted on stub axle 57 which carries a cam 58 that engages arm 59 of scraper 48 and pushes it toward the other side of the frame. A spring 60 returns the scraper to its position before being moved by the cam, whereby the scraper is caused to reciprocate along the surface of the roll. At the other end shaft 19 carries a pulley 61 over which belt 62 passes. Belt 62 also passes over pulley 63 mounted on shaft 39. When the nuts in the pockets of the nut belt reach balls 40 a pressure roller 64 engages belts 25ª and presses belts 25ª and the nuts in the pockets upward so that the nuts are pressed into balls 40 as shown in Fig. 7 and receive the marks carried thereon. Any other marks or words may be formed in the intaglio roll and the same can be duplicated in ink on any nuts or hard-fruit.

While I have shown the offset roll as being provided with inserts, in the form of yielding ball members, it is to be understood that the particular conformation of these inserts may be variously modified, and that the major requirements as to the characteristics of the offset roll is that it be provided with a yielding transfer surface such as will permit the nuts to be impressed or embedded therein in a printing operation. It is also pointed out that during this embedding of the nut in the yielding transfer surface said surface conforms to the irregularities of the nut surface and also prevents a rolling of the nut such as would cause a blurred printing impression.

The construction of the conveyer belt provides nut receiving pockets and the flexible belt 25ª provides flexible floor walls for the pockets which are successively flexed by the pressure roller 64 to partially eject the nuts from the pockets and embed them in the transfer surface of the offset roll.

Having described my invention, I claim:

1. In a printing machine, a hopper; a belt having pockets therein forming the bottom of said hopper, a roll having pockets therein; offset balls in said roll pockets, and means to place characters in ink on said balls, whereby when a nut in a pocket in the belt engages a ball in a pocket in the roll the character on the ball is printed on the nut.

2. In a printing machine, a hopper; a belt having pockets therein forming the bottom of said hopper; a brush adapted to keep more than one nut in a pocket from passing out of the hopper; a roll having pockets therein, offset balls in said roll pockets; and means to place characters in ink on said balls, whereby when a nut in a pocket in the belt engages a ball in a pocket in the roll the character on the ball is printed on the nut.

3. In a printing machine, a hopper; a belt having pockets therein forming the bottom of said hopper; a hollow roll having pockets therein; means to keep the interior of said roll cool; offset balls in said roll pockets; and means to place characters in ink on said balls, whereby when a nut in a pocket in the belt engages a ball in a pocket in the roll the character on the ball is printed on the nut.

4. In a printing machine, a hopper; a belt having pockets therein forming the bottom of said hopper; means to exhaust air from said pockets, a roll having pockets therein; offset balls in said roll pockets; means to place characters in ink on said balls, whereby when a nut in a pocket in the belt engages a ball in a pocket in the roll the character on the ball is printed on the nut.

5. In a printing machine, an offset member having a yielding transfer surface, means to place characters in ink on said surface, a conveyer having pockets provided with flexible floor walls and adapted to receive objects to be printed upon, and means functioning to successively flex the pocket floor walls to partially eject said objects from the pockets and embed them in the transfer surface of the offset member in a printing operation.

6. In a printing machine, an offset roll having yielding inserts, means to place characters in ink on said inserts, and means successively presenting irregularly shaped objects to the inserts as the roll rotates, to transfer said characters thereto.

7. In a printing machine, an offset roll having yielding inserts, means to place characters in ink on said inserts, means successively presenting irregularly shaped objects to the inserts as the roll rotates, and means functioning to embed the objects in the surfaces of the inserts in a printing operation, to transfer the characters to said objects.

8. In a printing machine, an offset roll, yielding balls carried thereby, means to place characters in ink on the balls, means successively presenting irregularly shaped objects to the balls as the roll rotates, to transfer the characters to said objects.

9. In a printing machine, an offset roll, yielding balls carried thereby, means to place characters in ink on the balls, means successively presenting irregularly shaped objects to the balls as the roll rotates, and means functioning to embed the objects in the surface of the balls in a printing operation, to transfer the characters to said objects.

In witness that I claim the foregoing I have hereunto subscribed my name this 1st day of December, 1919.

ANSEL S. WYSONG.